(12) United States Patent
Geiger et al.

(10) Patent No.: US 6,250,506 B1
(45) Date of Patent: Jun. 26, 2001

(54) DEVICE FOR DISPENSING A FLOWABLE SUBSTANCE AND ASSOCIATED CONTAINER

(75) Inventors: Wendy Geiger, Bethelem; William Overbaugh, Lakeside; Larry Bartoletti, Northfield, all of CT (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/518,661

(22) Filed: Mar. 3, 2000

(51) Int. Cl.[7] .................................................. B65D 35/56
(52) U.S. Cl. ......................................... 222/105; 222/413
(58) Field of Search .................................... 222/105, 413, 222/129.1, 333

(56) References Cited

U.S. PATENT DOCUMENTS

| | | | |
|---|---|---|---|
| 4,331,266 | 5/1982 | Bond | 222/107 |
| 5,104,002 | 4/1992 | Cahlander et al. | 222/1 |
| 5,237,910 | 8/1993 | Chigira | 99/282 |
| 5,839,610 | 11/1998 | Reese et al. | 222/129.3 |
| 6,006,657 | * 12/1999 | Ikuta | 222/105 |
| 6,056,157 | * 5/2000 | Gehl et al. | 222/105 |

* cited by examiner

Primary Examiner—Philippe Derakshani
(74) Attorney, Agent, or Firm—Winston & Strawn

(57) ABSTRACT

The invention relates to a dispensing device for dispensing a flowable substance to form a beverage. The device includes a removable container which in a filled state has a main flexible pouch into which is stored the flowable substance and a fitment located at the bottom of the pouch and tightly attached thereto. The fitment is shaped so as to include a pair of side flanges at least one passage for allowing the flowable substance to pass therethrough by gravity. The device also has a dispensing base adapter that includes a pair of side channel-type guides shaped to guide in slidable arrangement the flanges and a bottom bearing surface for supporting the fitment. In addition, the device has an elastic member for maintaining a downwardly oriented pressure of the flanges onto the bottom bearing surface effective to create a substantially tight seal arrangement and prevent the flowable substance from entering the space between the flanges and the bottom bearing surface.

15 Claims, 8 Drawing Sheets

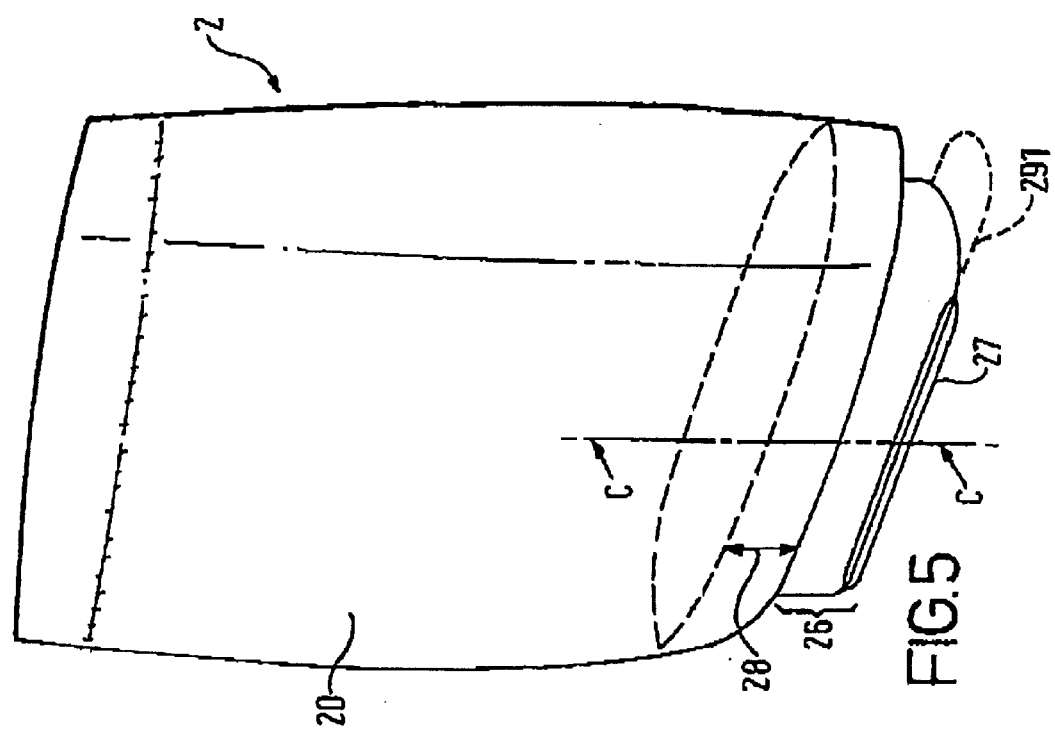
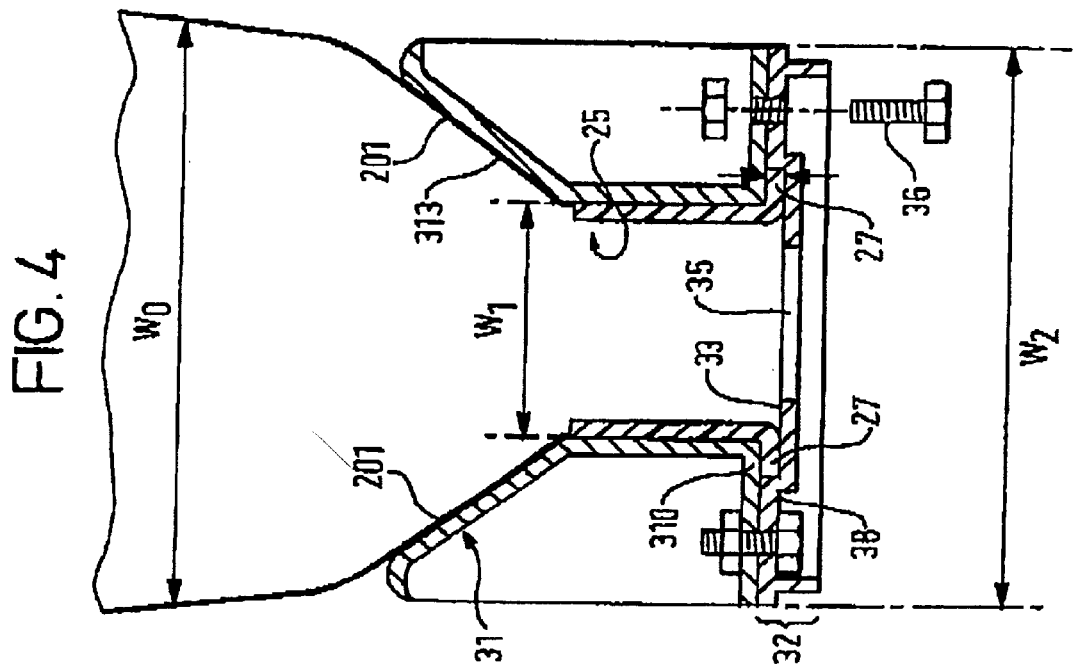

DEVICE FOR DISPENSING A FLOWABLE SUBSTANCE AND ASSOCIATED CONTAINER

FIELD OF THE INVENTION

The present invention generally relates to dispensing devices suitable for dispensing flowable substances, in particular dry soluble flowing materials, for use in beverage dispensing or vending machines.

BACKGROUND OF THE INVENTION

Various automated beverage dispensers for making hot or cold beverage products are known in the art. In a conventional beverage dispenser, a metered amount of water-soluble beverage powder, stored in powder refillable canisters, and a metered amount of hot or cold water, supplied from a water source, is conveyed into a mixing chamber to produce a beverage or soup product, which is then dispensed into a receptacle and served.

The conventional dispensing units comprises a series of canisters mounted at various locations within the machine for holding large quantities of dry powder such as milk, sugar, chocolate, powdered creamer, ground tea and coffee. The canisters are generally rigid plastic or metal boxes having a removable lid to allow periodical refilling with the dry powders. On-demand dispensing of measured amounts of the powder within the canister can be produced by augering or other delivery methods that are well known in the art.

These canister-based dispensing machines have serious drawbacks. In particular, the refilling of the canisters requires time consuming manual operations from the operator. The operator has usually to refill the canisters by pouring the powder from large powder bags. This can cause significant loss of powder and hygienic problems due to possible contamination with the outside environment. Periodical cleaning of the machine is also rendered necessary to avoid these hygiene hazards.

Another problem associated with the dispensing of dry and powdered materials in canisters is that such materials are very hygroscopic and therefore have a very high tendency to form caking, bridging or rat holes within the canister. These cause serious flowing problems and consequently affect the accuracy of the metered dosage during reconstitution of the beverage. As the canisters are built to remain removable or openable, it is very difficult to ensure a tight arrangement of the canister to prevent the environmental humidity from reaching the powder, especially when the powder is left for storage during extensive periods of time, such as during several weeks or so.

Canisters due to a lack of flexibility are also cumbersome and the vending machines must be sufficiently oversized to allow the desired number of the canisters to be mounted therein. There is an increasing tendency to promote smaller vending systems but it is detrimental to the powder capacity and to the choices for varied beverages.

Therefore, there is a need for a novel dispensing device which overcomes the disadvantages of the prior art.

SUMMARY OF THE INVENTION

The present invention provides a dispensing device for flowable substances, especially dry powdered food materials, which can be more conveniently and more rapidly refilled with powder while necessitating less labor time. In addition, this dispensing device ensures essentially no loss of the flowable substance, reduces cleaning requirements and consequently diminishes the risks of potential hygienic hazards. Furthermore, the dispensing device also preserves the flowable substance from environmental humidity by reducing and/or delaying moisture ingress. This, in turn, promotes the flowing capabilities of the powder substance through the system by preventing the substance from caking or clumping. Finally, the invention allows optimization of the size of the dispensers or vending machines as a function of the capacity of service and of the choice of beverages.

Therefore, the present invention relates to a dispensing device for dispensing a flowable substance, especially for a beverage vending machine. This device includes a removable container which in a filled state has a main pouch into which is stored the flowable substance and a fitment located at the bottom of the pouch and attached thereto. The fitment is shaped to include a pair of side-extending end flanges. The fitment further comprises at least one passage for allowing the flowable substance to pass therethrough by gravity. The device further has a dispensing base adapter comprising a pair of side channel guide members shaped to guide in slidable arrangement the flanges and a bottom bearing surface for supporting the fitment. A closure member is further provided for maintaining a downwardly oriented pressure on the flanges toward the bottom bearing surface. This pressure is effective to create a substantially tight seal arrangement and prevent the flowable substance from flowing between the flanges and the bottom bearing surface.

In a preferred embodiment, the fitment of the container is of a boat style comprising an upper sealing portion having an elongated boat style shape along which the bottom of the pouch is tightly sealed and a lower engaging portion at the lower end of which laterally extends the pair of flanges and which defines the at least one passage therebetween. This construction has numerous advantages including:

- a reliable and quick latching system for connecting a supple container to a rigid piece of equipment;
- adaptability to form to the suitable shape for promoting the flow and dispense of the substance;
- a reliable, efficient and strong seal configuration which preserves the flowable substance inside in dry and clean conditions.

In one embodiment, the flanges of the fitment include elastic member which comprises an upward oriented brim at the edge of the flanges when the container is in a disengaged position. The channel guide members are configured to force the brim to flex downwardly as the flanges slidably engage the channel guide members of the dispensing base adapter. Advantageously, the upper surface of the channel guide members provides a restriction which is smaller than the overall dimensional height of the brim. Such a construction provides essentially perfect sealing conditions for a closed system with, on one hand, reduced ingress of humidity, and on the other hand, substantial elimination of loss of powder material that could find its way outside the system.

In an alternative embodiment, the channel guide members may include a spring member which causes the expansion of the dimensional height sufficiently to adjust to the thickness of the flanges while forcing the flanges to tightly press on the bottom bearing surface of the fitment. In that case, this is the system in the dispenser that carries the elasticity function, thus simplifying the construction while making it more robust.

In another embodiment, emptying of the container may be facilitated and the space required may be reduced if the dispensing base adapter further comprises a pair of side bearing members extending upwardly and arranged in a close relationship with the pouch to support the flexible sidewalls of the pouch so as to maintain the pouch in a substantially upright position.

The invention also relates to a container especially adapted to closely fit with a dispensing device for preparing beverages comprising a pouch sized to receive a flowable food substance and a fitment portion located at the bottom of the pouch and attached thereto. The fitment comprises a pair of side-extending end flanges and at least one passage therebetween within which the flowable substance can flow by gravity and a removable closure member for sealing the passage before the container is in a fully engaged state within the dispensing device.

In a preferred aspect of the invention, the fitment is of a boat style and comprises an upper sealing portion having an elongated boat-style shape along which the bottom of the pouch is tightly sealed and a lower engaging portion at the lower end of which laterally extends the flanges. More preferably, the flanges of the fitment comprise an upward oriented brim at the edge of the flanges.

In another aspect, the invention relates to a beverage dispensing apparatus comprising means for adapting a container with a fitment having at least one pair of flanges and at least one passage therebetween for the flowable substance to flow by gravity; wherein the means comprise a pair of side channel guide members shaped to guide in slidable arrangement the flanges of the fitment and a bottom bearing surface for supporting the fitment. Preferably, the means for adapting the container includes means for holding the container in an upright position when the container is in a filled state and after correct positioning of the container with the dispensing apparatus.

BRIEF DESCRIPTION OF THE DRAWINGS

Preferred features of the present invention are disclosed in the accompanying drawings, wherein similar references characters denote similar elements throughout the several views, and wherein:

FIG. 4 is a cross sectional view of the dispensing device along line B—B of FIG. 3;

FIG. 5 is a perspective view of the container itself according to the embodiment of FIGS. 1–4;

DETAILED DESCRIPTION OF THE PREFERRED EMBODIMENT

Figure 1:
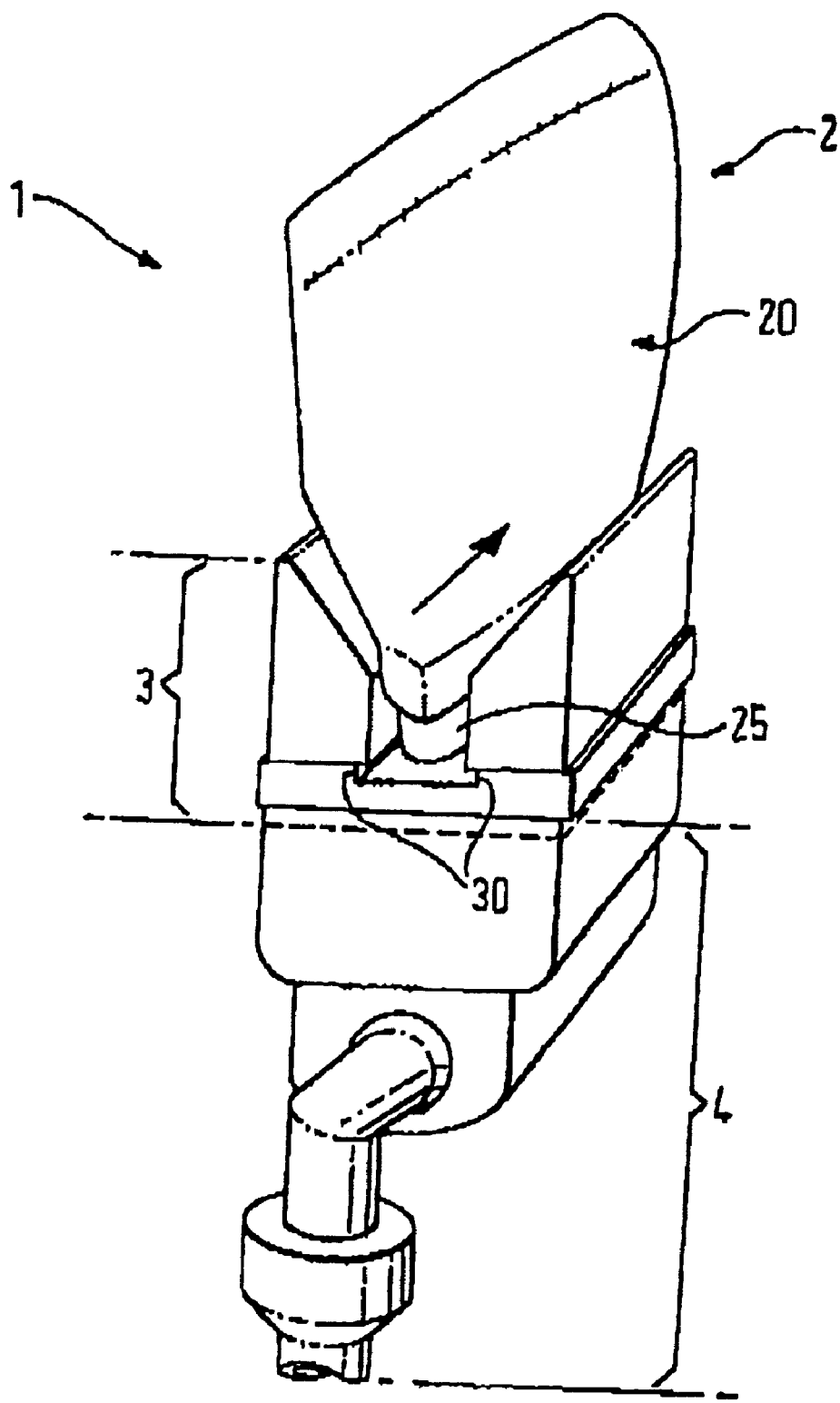
FIG. 1 is a perspective view of a dispensing device for the flowable substance made in accordance with the present invention with the container fitted in operation with the rest of the dispensing device.

A preferred exemplary embodiment of the invention is illustrated in FIGS. 1 to 11 wherein like numerals represent like parts. The dispensing device 1 is comprised of a removable container 2, a lower dispensing base adapter 3 and further lower down a dispensing unit 4.

The dispensing device is preferably a part of a more important beverage dispenser which can be of a general type in that it is a liquid dispensing type of vending machine from which the customer selects the type of drink that he/she wishes, such as coffee or tea, possibly creamer and/or sugar, or soup, etc. The downstream part of the dispenser as well as the automatic and control system are known in the art and will not be illustrated in detail herein. The dispensing device that is shown in the figures may be implemented in a more complete dispenser or vending machine with single or multiple devices being used depending upon the number of different types of powders or powder products desired within each machine. When multiple dispensing devices are used, each corresponds to only one type of powder such as coffee, decaffeinated coffee, cocoa, creamer, tea, powdered soup, etc., to provide a variety of different products in one machine.

The dispensing device 1 preferably comprises a removable container 2 which is mainly constituted of a flexible pouch 20 and a lower substantially rigid elongated fitment 25. The pouch 20 is intended to form a refill of soluble powder of several tens of grams to several thousands of grams, for instance, more specifically between about 200 grams to about 2.5 kg. The pouch is preferably flexible, but a certain degree of rigidity of the sidewalls of the pouch may be envisaged as far as the side walls remains relatively flexible upon fitting within the rest of the dispensing device. There are numerous advantages for a flexible pouch compared to a non-deformable pouch, including space and cost savings, ease of manufacturing, improved airtight sealing, etc. The pouch may be made of metalized and/or non metalized plastic materials as desired. The pouch may be made of a laminate having oxygen and water barriers and optionally, UV barriers. Cardboard sheets may be part of the laminate to improve the rigidity of the pouch provided it remains sufficiently deformable. A typical pouch laminate is 48 gauge—metallized Polyester/Linear Low Density Polyethylene having an overall thickness of about 3.5 millimeters.

At the lower end of the pouch is sealed a fitment 25 made of a relatively more rigid material such as an injection molded plastic. The structure of the fitment and its connection to the pouch will be described in more detail further in the course of the description in relation to the corresponding figures.

Importantly, the fitment 25 plays the role of interface between the pouch onto which it is fixedly connected and the dispensing base adapter 3 mounted on the rest of the dispensing device. The dispensing base adapter 3 is intended to be part of the dispenser machine and fits to a dispensing unit 4 located directly below the base adapter 3. The base adapter may be attached to the dispensing unit by any suitable connection means. For instance, it may simply fit by friction onto the dispensing unit. In alternative embodiments, the connection means may be removable positive connection means such as bolts or permanent connection means such as rivets or welding.

Figure 2:
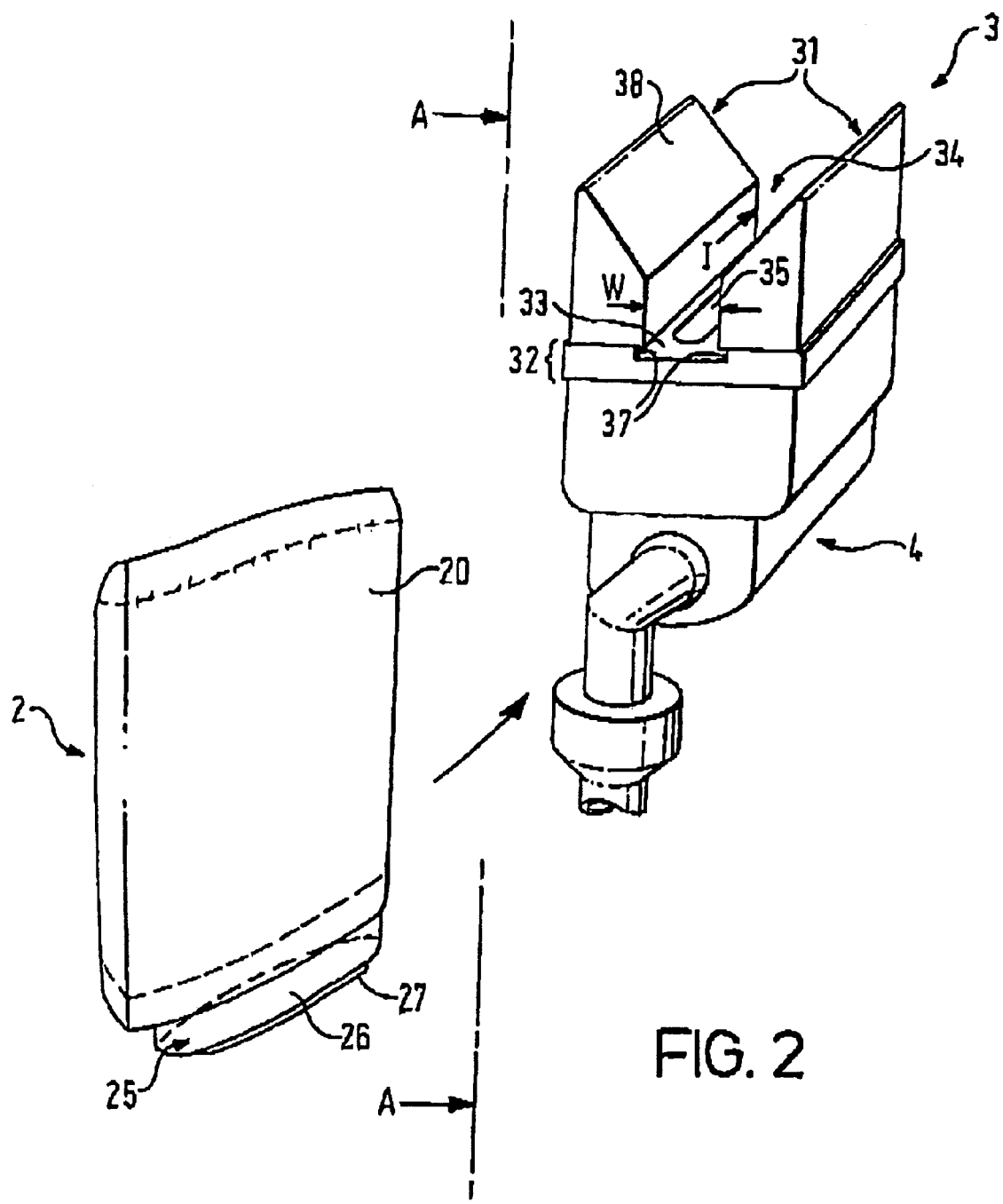
FIG. 2 is a view similar to FIG. 1 before the container is installed in the dispensing device.

The dispensing base adapter 3 and the removable container 2 are complementary shaped so as to provide a slidable connection along a substantially horizontal and longitudinal direction I therebetween as shown in FIG. 2. For that, the elongated fitment 25 comprises a lower engaging portion 26 which forms a substantially vertically oriented oval rigid ring and a pair of outwardly extending side flanges 27 which extend on each side at the lower ends of the engaging portion 26. Turning to the dispensing base adapter, a pair of side bearing members 31 are provided at a location laterally spaced apart a distance W sufficient to allow the lower engaging portion 26 to engage therebetween. Extending transversally below the side bearing members 31 is a support base 32 forming a bearing bottom surface 33 of the adapter demarcating with the side members 31 a substantially longitudinal opening 34 for the reception of the fitment. Along the centerline of the bearing bottom surface 33 is aligned an elongated passage 35 for the powder to communicate in the lower dispensing unit 4. The support base 32 and the bearing side members 31 are attached together by connection means such as screws/holes/nuts assemblies 36 distributed along each exterior side of the base adapter to form a substantially fixed subassembly.

As illustrated in FIGS. 1 and 4, the two side bearing members 31 form together an upwardly tapered configuration with upper slanted portions 313 which extend in vertical direction along a significant height of the bearing members. The purpose of these slanted portions to provide support for the sidewalls 201 sufficient to maintain the pouch in upright position when it is filled with powder and consequently to facilitate the flow of the powder in the direction of the passage 35. It should be noted that the container is specially designed to present a relatively narrow fitment of external width $W_1$, lower than the overall width $W_0$ of the pouch, which is in fact necessitated for reducing as much as possible the space required for the dispensing lower part of the device of overall width $W_2$. This space saving arrangement can be advantageously used for making more compact a single beverage vending machine and/or for increasing the number of dispensing devices within a multiple product vending machine.

The optimum height and inclination of the upper slanted portions 201 of the side bearing members 31 depend upon the size and capacity of the pouch and may be easily determined by routine experiments within the normal skill of the man in the art. It must be noted that the general profile of the bearing member may encompass various modifications. For example, the slanted portions may be replaced equally by curved tapering portions. Vertical bearing portions may also be used but may be detrimental due to increase in space requirements or decrease in overall capacity of the pouch.

Figure 3:
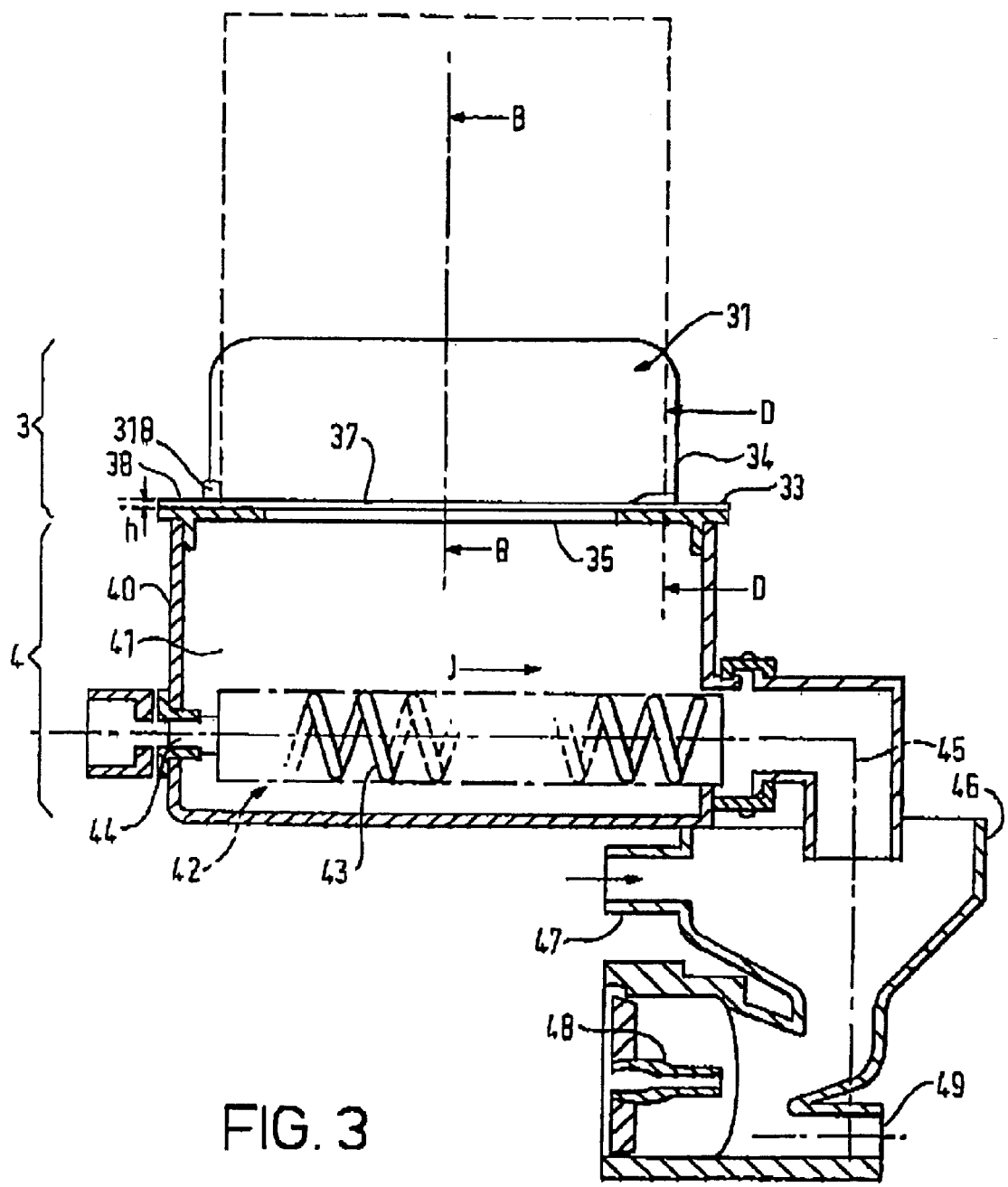
FIG. 3 is a cross-sectional view along line A—A of FIG. of the dispensing device to illustrate internal components.

A pair of side guiding recess or channel guide members 37 results from the combination of the bearing members 31 and the support base 32. Each recess may preferably extend along the entire length of the bearing members 31 as illustrated in FIG. 3. The support base is preferably shaped so as to present a shallow step 38 which corresponds to the dimensional height "h" of the recesses. The upper surface of the recesses is further limited by the lower inner edges 310 of the bearing members 31 which extends inwardly beyond the shallow step 38.

Figure 6:
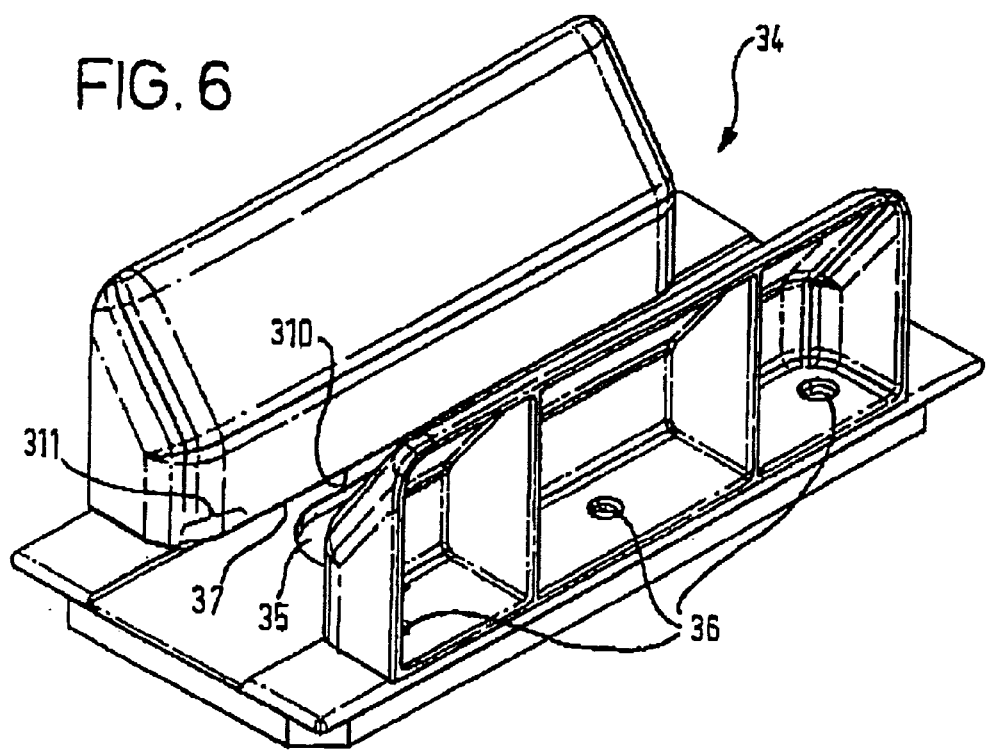
FIG. 6 is a perspective view of the dispensing base adapter of the invention.
Figure 7:
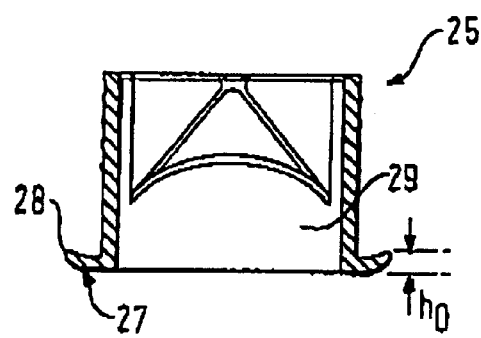
FIG. 7 shows a cross sectional view along line C—C of the fitment of the container of FIG. 5.
Figure 7A:
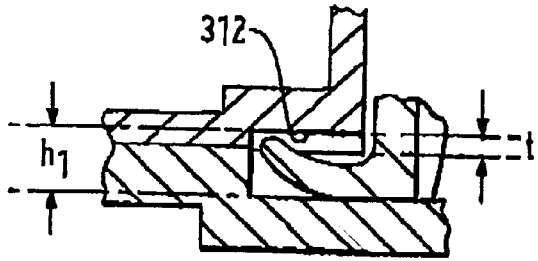
FIG. 7A illustrates a detail along line D—D of FIG. 3 of the sliding engagement of the fitment within the base adapter.
Figure 7B:
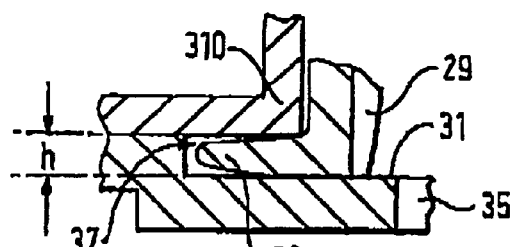
FIG. 7B illustrates a view similar to FIG. 7B but along line B—B of FIG. 3.
Figure 8:
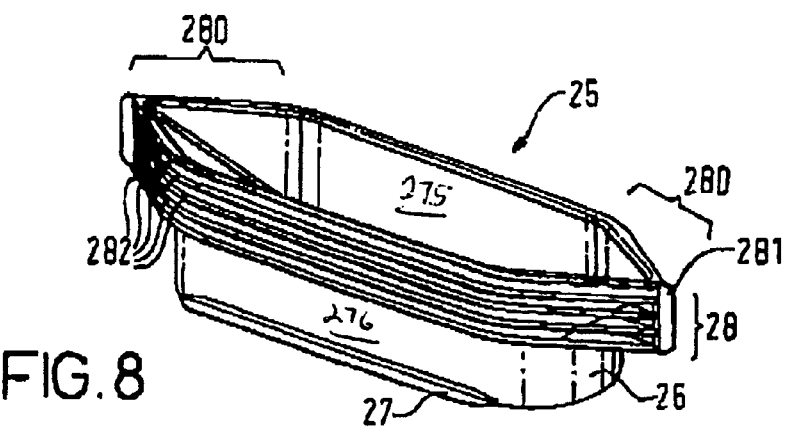
FIG. 8 illustrates a perspective view of the fitment of the container of FIG. 5.
Figure 9:
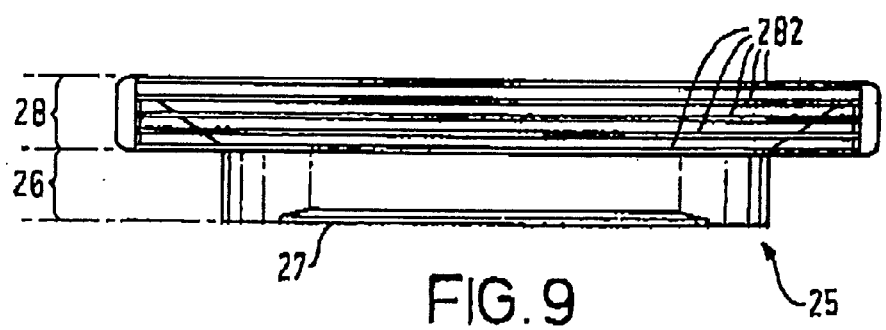
FIG. 9 is a side view of the fitment of FIG. 8.
Figure 10:
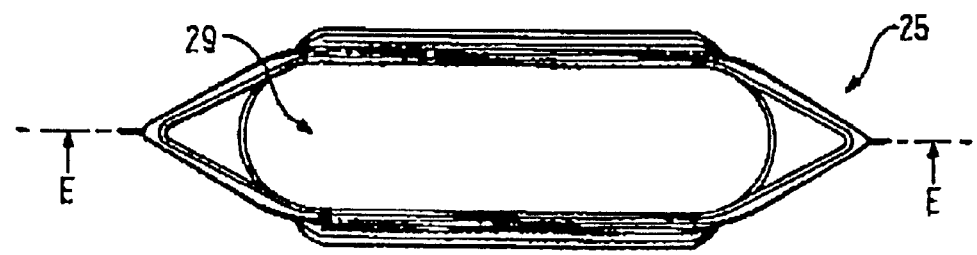
FIG. 10 is a top view of the fitment of FIG. 8.

As illustrated in FIGS. 6, 7, and 7B, the side channel guide members or recesses 37 provide along a significant portion of the adapter and, at least along the lateral side of the passage 35, with a tight slidable arrangement for the flanges of the fitment. According to an important aspect of the invention, the connection between the fitment and the adapter is rendered tighter by providing a spring effect carried on the flanges which forces the flanges 27 to bend and compress against the bottom bearing surface 31 of the support base. More specifically, the flanges of the fitment comprises an upward oriented brim 28 at the edge of the flanges. The brim forms an upturned resilient lip that is forced to unbend within the restricted guiding recesses 37 as the flanges are slid into place. Because the height "$h_0$" of the brim, when the container is in a disengaged position, is taller than the dimensional height "h" of the recesses 37, the brim is flexed downward so that it comes almost flat within the recess and creates a tight seal at the interface between the bearing surface 31 and the flanges. Consequently, the passage 35 is tightly connected to the interior 29 of the fitment and efficiently isolated from the outside environment which thus eliminates any risk of loss of the powder while also minimizing moisture ingress into the container.

The introduction of the fitment within the channel guide members due to these taller brims is preferably facilitated by advantageously providing an entry portion 311 forming a region of higher dimensional height "$h_1$" along a predetermined length of the guide means as better illustrated in FIGS. 3, 6 and 7A. For that, the bearing members advantageously include a slight inverse step 312 with a progressively decreasing thickness "t" in the direction of the interior of the opening 34. As a result of this decreasing distribution of thickness, the brims progressively flex as the fitment slidably engages into the adapter and the sliding motion of the fitment is rendered smoother without risking blockage of the container in a non-fully engaged position along the adapter.

FIGS. 5, 7 and 8 to 11 illustrates a preferred construction of the fitment of the container according to one preferred mode of the invention. The fitment is of a boat style having a sealing upper portion 28 having an elongated general profile with substantially vertically oriented side sealing surfaces 275, 276 with progressively narrowing opposite ends 280 terminated by short substantially flat edges 281. The ends 280, 281 are substantially flat and front and back ends of the fitment. The side members are also substantially flat and are spaced apart at the widest distance of the V-shaped ends 280, 281, similar to the configuration of a canoe. Such design has proved to be in the context of the invention the best mode for sealingly attaching the flexible pouch along an elongated configuration to the relatively more rigid fitment and guaranteeing a strong and air tight seal. However, more conventional constructions and sealing arrangement can also be used for certain products. For example, the side sealing surfaces can be configured as sidewalls which are at least partially or completely accurate as this results in a separation of the central portion of the side surfaces at a greater distance than the ends. In addition, sidewalls that include flat and accurate sections can be used. Of course, for optimum efficiency, the bearing surfaces 31 should be designed to conform to the sidewalls of the fitment.

As illustrated, the fitment dispenses the flowable substance through a main passage 29 which includes a lower section 290 having a shape and dimensions preferably matching the exact shape and dimensions of the passage 35 of the base adapter. The upper portion of passage 29 is configured and dimensioned to match that of the sidewalls 275, 276 and ends 280. Preferably, the upper portion of the passage is provided a pair of angled or downwardly oriented chamfered end portions 287 which favor the collection of powder from the sides of the pouch toward the lower section of passage 29. Therefore, the combination of the fitment design and the flexibility of the pouch works toward a more efficient and reliable emptying of the pouch. The sealing surfaces of the upper portion 28 are preferably structured to increase the strength of the seal with a series of longitudinally oriented ribs 282. The connection between the pouch and the fitment is preferably obtained by heat sealing along the ribbed sealing surfaces of the portion 28. In case it is appropriate due to the nature of the materials, heat sealing may be replaced by ultrasonic or friction welding or gluing with adhesives. The sealing connection has to withstand the mechanical efforts during the replacement of the container within the dispensing device although these efforts are kept minimal. It has also to withstand wet and warm ambient conditions such as storage extensive periods in tropical climates.

The fitment is preferably made of injection molded plastic material. The nature of plastic material and its thickness and hardness may vary depending upon the desired dimensions and rigidity for the intended purpose. Preferably, the plastic material has a low coefficient of friction to favor the sliding motion along the dispensing adapter. It may preferably be selected among polyolefine based plastic materials such as polyethylene or polypropylene material.

Referring to FIG. 5, the refill container 2 of the invention is of a simple but elegant closed concept especially adapted to quickly fit to the static part of the dispensing device. A significant amount of room can be saved with the general elongated shape of the pouch compared to large cylindrical or rectangular rigid containers. From a construction standpoint, the lower passage 29 of the fitment is securely sealed by a peelable closure or membrane 291 which can be stripped off after or at the time the fitment is engaged in the adapter. The pouch preferably includes barrier layers and its sealed membrane forms an impervious container that can be easily and conveniently transported and stored with essentially no risk of moisture ingress before it is coupled to the delivery system. Then, the coupling to the delivery system is such that a moisture ingress is still essentially prevented compared to the box type hopper and lid assemblies of the current state of the art.

Figure 11:
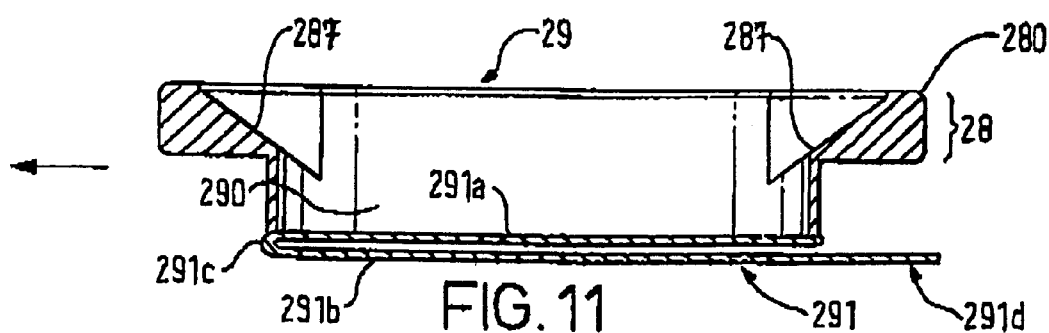
FIG. 11 is a cross sectional view along line E—E of FIG. 10.
Figure 12:
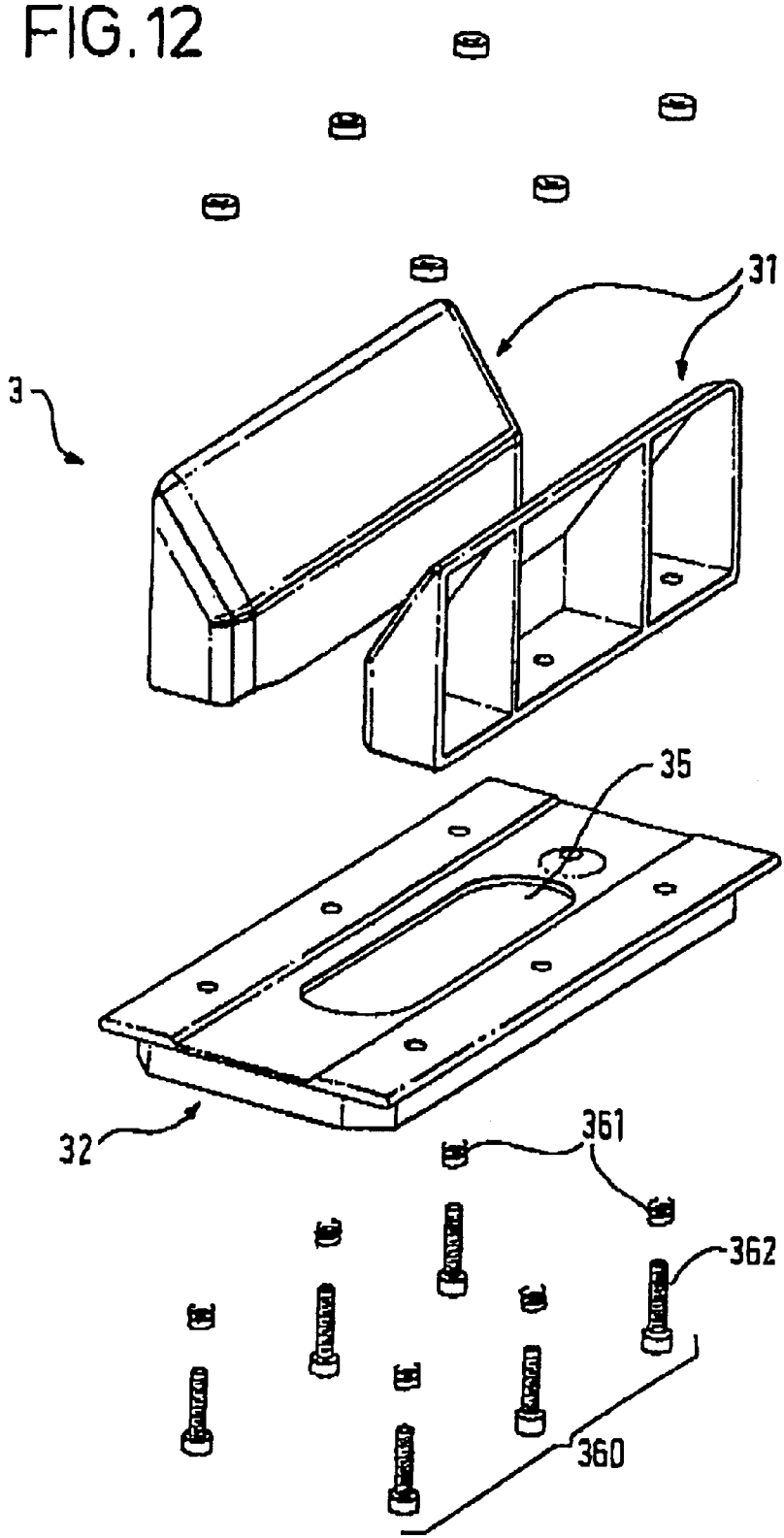
FIG. 12 is an exploded perspective view of the dispensing base adapter according to a variant of the invention.
Figure 13:
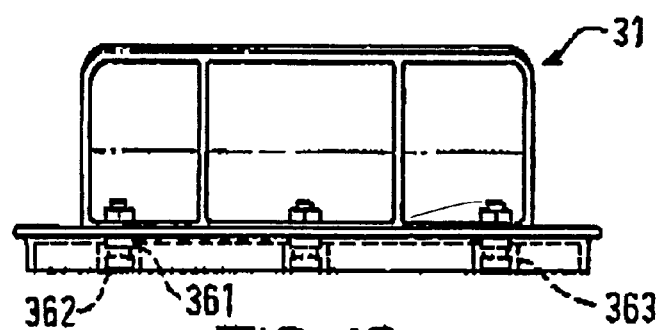
FIG. 13 is a side view of the adapter of FIG. 12.
Figure 14:
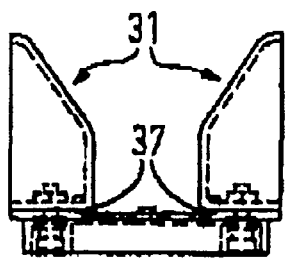
FIG. 14 is a front view of the adapter of FIG. 12.
Figure 15:
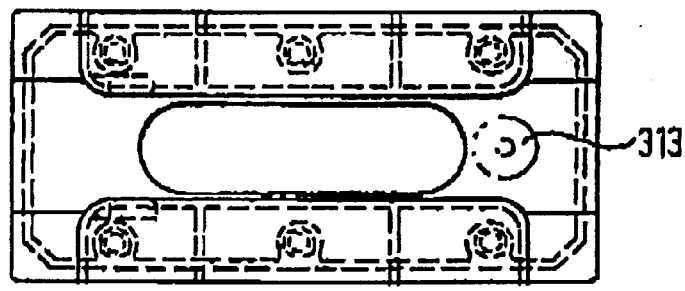
FIG. 15 is a top view of the adapter of FIG. 15.

FIG. 11 shows one solution for the peelable closure which has a first band portion 291*a* securely attached to the lower edge of the fitment around the lower section 29 of the passage and a second band portion 291*b* extending from the termination of the first portion by a folded portion 291*c* at one end and tab portion 291*d* terminating beyond the fitment contour at the opposite end. Upon introduction of the fitment in direction A, which corresponds to the side of the folded portion, the band may be removed by pulling the tab in the opposite direction to progressively free the passage 29. The progressive opening of the passage preferably corresponds to the progressive matching of the passage of the container 29 and the passage of the adapter 35 together in order to prevent the powder from soiling the vicinity of the passage of the adapter. Friction during the sliding motion also helps to partly strip off the closure. Other mechanical means may be used which may engage the free portion 291*b* and strip off the closure progressively while the fitment is continuously fitted in the adapter. In that case, the free portion may advantageously be made shorter so as to engage at the time the fitment is fitted in the adapter. European Patent Application number 99200394.7 filed on Feb. 2, 1999 describes various solutions of peelable closures adapted to be stripped off in conditions of introduction of a powder refill in a vending machine; as these are useful in the present invention the disclosure of that application is herein incorporated by reference.

Figure 16:
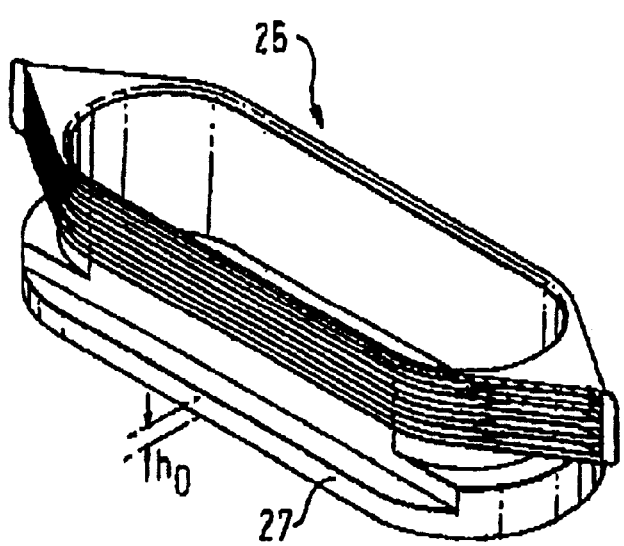
FIG. 16 is a perspective view of the fitment according to the variant of FIGS. 12 to 15.

FIGS. 12 to 15 illustrates another variant of the invention in which the elastic means for making a tight seal between the fitment and the dispensing base adapter are integrated to the adapter itself. In this arrangement, the side bearing members 31 are elastically mounted onto the base plate 32 via series of spring biased mechanical connections 360. More precisely, spring members 361 are inserted in sockets 363 of the base plate between the screws 362 of the connections and the abutting bottom surfaces of the sockets. As a result of this specific elastic construction, the channel guide members or recesses 37 of the adapter are capable of expanding in dimensional height sufficiently to adjust to the thickness of the flanges 27 of the fitment show in FIG. 16 and consequently form a press-fit arrangement. The thickness of the fitment "$h_0$" of the flanges 27 is chosen to be slightly taller than the height of the recesses 37 so as to allow the side bearing members to be forced upwardly slightly upon the action of sliding the fitment and to cause fitment to be compressed by reaction against the support base to reduce moisture ingress into the dispensing device and powder leakage outside the device. In that embodiment, the fitment flange may be made more rigid to support the compressive forces exerted thereon.

Referring again to FIG. 3, an abutment member 318 is located on the rear of the bottom bearing surface 33 to longitudinally cooperate with the front side of the engaging portion of the fitment and fix the container in the right position when the passage 29 of the fitment matches the contour of the passage 35 of the adapter.

The dispensing device of the invention has the base adapter 3 connected to a lower dispensing unit 4. The dispensing unit is basically composed of a hopper portion or housing 40 having walls demarcating a interior volume 41 for collecting the powder in downward direction toward a dosing mechanism 42. The dosing mechanism may be of various type. In a preferred embodiment, it would comprise a rotary screw or auger 43 axially mounted along the bottom of the housing. The screw or auger is driven in rotation through an axle 44 coupled to an electrical motor secured on the rear of the dispensing device (not shown). The electrical motor is preferably a non-intermittent DC motor system adaptable to commonly found electrical power supply. The speed as well as the time sequences of the motor can be properly adjusted according to electronic controlling means using programmated dispensing schemes to dispense the product in pre-set quantities. In an alternative the motor may be a DC stepping motor system which favors portion sizing of the powder more easily.

The powder is transported in direction "J" by the screw or auger toward an outlet 45 and is allowed to fall into a mixing bowl 46 from above. A predetermined amount of hot or cold water may be added from a separate inlet 47. The mixture may be transferred to a whipping device 48 which may optionally be turned on when a whipping action is required for making a foamy beverage, for instance. The beverage is then transported to be dispensed by a tube 49 to a recipient or to another mixing bowl and whipping assembly when a mixture want to be made with other types of powder. Suitable arrangements of tubing and mixing and whipping zones are possible depending on the various combinations of preparations desired.

Although the use of flexible pouches is preferred as refills for the beverage dispensing apparatus of the invention, other containers may also be used such as those made of blow molded or injection molded plastics.

As various changes could be made in the above constructions without departing from the scope of the invention, it is intended that all matter contained in the above description or shown in the accompanying drawings shall be interpreted in an illustrative rather than limiting sense.

What is claimed is:

1. A dispensing device for dispensing a flowable substance for the preparation of a beverage comprising:
   a removable container comprising a pouch having a top portion and which in a filled state contains a flowable substance and a bottom portion that includes a fitment attached thereto, the fitment being configured and dimensioned to include a pair of side extending end flanges, a bottom opening and at least one passage for allowing the flowable substance to pass therethrough and out of the opening by gravity;
   a dispensing base adapter comprising a pair of side channel members configured and dimensioned to guide in slidable arrangement the end flanges of the container fitment, and a bottom bearing surface for supporting the fitment; and
   a closure member for maintaining pressure on the end flanges toward the bottom bearing surface so as to create a substantially tight seal arrangement between the adapter and container.

2. The dispensing device of claim 1, wherein the fitment of the container comprising an upper sealing portion including a pair of elongated side walls having a central portion that is spaced apart and ends which are joined to form a boat shape, and a lower engaging portion which laterally extends between the pair of flanges and which defines the at least one passage therebetween.

3. The dispensing device of claim 1, wherein at least one of the fitment flanges include an upturned flexible brim when the container is in a disengaged position, wherein the brim is forced to flex downward when the flange slidably engages the channel guiding member of the dispensing base adapter to flatten out the brim and create a tight seal between the container and the adapter.

4. The dispensing device of claim 1, wherein both channel members are configured and dimensioned to provide restricted channel openings, and each fitment flange includes an upturned flexible brim when the container is in a disengaged position, wherein the brims are forced to flex downward when the flange slidably engages the channel guiding member of the dispensing base adapter to flatten out the brims and create a tight seal between the container and the adapter.

5. The dispensing device of claim 4, wherein the channel openings of the channel guide members include an entry portion forming a region of higher dimensional height sufficient to favor the free engagement of the flanges.

6. The dispensing device of claim 5, wherein the channel openings further include an exit portion which includes a region of lower dimensional height and a central portion having a height which gradually decreases from the entry portion to the exit portion.

7. The dispensing device of claim 1, wherein channel openings include a spring member arranged therein which enables the channel guiding members to expand in dimensional height sufficiently to adjust to the thickness of the fitment flanges while forcing the flanges to tightly press on the bottom bearing surface of the fitment.

8. The dispensing device of claim 1, wherein the dispensing base adapter further comprises a pair of side bearing members extending upwardly and arranged in a close relationship with the pouch to support the flexible sidewalls of the pouch so as to maintain the pouch in a substantially upright position.

9. The dispensing device of claim 1, wherein the side bearing members include upper slanted portions having dimensions and inclinations effective to support the sidewalls of the pouch from a state in which the pouch is substantially filled with the flowable substance.

10. The dispensing device of claim 1, wherein the base adapter is connected to a dispensing unit comprising a hopper portion for collecting the flowable substance toward a dosing assembly located at the bottom of the hopper portion for dosing a predetermined of flowable substance transported by the dosing device toward an outlet of the hopper portion.

11. The dispensing device of claim 10, wherein the dosing device comprises a dispensing system that includes a rotary auger driven in rotation via an electrical powered motor.

12. A container adapted to closely fit within a dispensing device for preparing beverages, comprising
   a pouch sized to receive a flowable food substance;
   a fitment being configured and dimensioned to include a pair of side extending end flanges, a bottom opening and at least one passage for allowing the flowable substance to pass therethrough and out of the opening by gravity; and
   a removable closure member for sealing the opening before the pouch is in a fully engaged state within the dispensing device.

13. The container of claim 12, wherein the fitment comprises an upper sealing portion including a pair of elongated side walls having a central portion that is spaced apart and ends which are joined to form a boat shape, and a lower engaging portion which laterally extends between the pair of flanges and which defines the at least one passage therebetween.

14. A beverage dispensing apparatus comprising an adapter for receiving a container having a fitment that is configured and dimensioned to include a pair of side extending end flanges, a bottom opening and at least one passage for allowing the flowable substance to pass therethrough and out of the opening by gravity, the adapter comprising a pair of side channel members configured and dimensioned to guide in slidable arrangement the end flanges of the container fitment, and a bottom bearing surface for supporting the container fitment.

15. The beverage dispensing apparatus according to claim 14 wherein the adapter further includes a pair of upwardly extending side bearing members for supporting a flowable substance filled container in a correct position for dispensing of the substance.

* * * * *